（12）United States Patent
Dörfler et al.

(10) Patent No.: US 10,948,095 B2
(45) Date of Patent: Mar. 16, 2021

(54) VALVE AND VALVE ARRANGEMENT

(71) Applicant: Alfmeier Präzision SE, Treuchtlingen (DE)

(72) Inventors: Erich Dörfler, Landsberg (DE); Ronny Gehlmann, Allersberg (DE); Helmut Auernhammer, Höttingen (DE); Matthias Mitzler, Graben (DE)

(73) Assignee: Alfmeier Präzision SE, Treuchtlingen (DE)

( * ) Notice: Subject to any disclaimer, the term of this patent is extended or adjusted under 35 U.S.C. 154(b) by 36 days.

(21) Appl. No.: 16/413,766

(22) Filed: May 16, 2019

(65) Prior Publication Data
US 2019/0353266 A1  Nov. 21, 2019

(30) Foreign Application Priority Data

May 18, 2018  (DE) ...................... 10 2018 112 090.7

(51) Int. Cl.
*F16K 27/02* (2006.01)
*F03G 7/06* (2006.01)
*F16K 15/18* (2006.01)

(52) U.S. Cl.
CPC .......... *F16K 27/0209* (2013.01); *F03G 7/065* (2013.01); *F16K 15/18* (2013.01)

(58) Field of Classification Search
CPC ...... F16K 31/002; F16K 31/025; F16K 11/22; F16K 27/003; F16K 27/02; F16K 31/02;
(Continued)

(56) References Cited

U.S. PATENT DOCUMENTS 6,929,019 B2 * 8/2005 Weinmann ............ F16K 31/006
  137/15.21
2003/0070716 A1 * 4/2003 Giousouf .............. F16K 31/025
  137/625.65
(Continued)

FOREIGN PATENT DOCUMENTS

CN  101675279 A   3/2010
CN  102679039 A1  9/2012
(Continued)

OTHER PUBLICATIONS

German Patent and Trademark Office, Office Action, dated Apr. 8, 2020, with English Translation.
(Continued)

*Primary Examiner* — Michael R Reid
(74) *Attorney, Agent, or Firm* — JK Intellectual Property Law, PA

(57) ABSTRACT

A valve includes a flow chamber, an actuating chamber, and an opening. An actuating element can close or open the valve opening. An SMA element can move the actuating element in the opening direction. The flow chamber and the actuating chamber are separated by a separating wall. A first area of the flow chamber is attachable to an air supply unit to supply air to the flow chamber. A second area of the flow chamber is attachable to a media reservoir and is connectable to atmosphere to release air from the flow chamber via an opening. An actuator is pivotable on the valve housing via a second end section, and has a first end section coupled adjacent a first end of the actuating element so that the opening to the atmosphere is either released or closed.

19 Claims, 6 Drawing Sheets

(58) Field of Classification Search
CPC .. F16K 99/0038; F16K 27/0209; F16K 15/18; F03G 7/065
See application file for complete search history.

(56) References Cited

U.S. PATENT DOCUMENTS

2007/0023089 A1   2/2007   Beyerlein et al.
2018/0038514 A1   2/2018   Kuszneruk et al.

FOREIGN PATENT DOCUMENTS

| | | |
|---|---|---|
| CN | 203051810 U | 7/2013 |
| DE | 10 2005 060 217 A1 | 7/2006 |
| DE | 10 2016 219 342 A1 | 4/2018 |
| DE | 102016219346 A1 | 4/2018 |
| DE | 10 2017 204 662 B3 | 7/2018 |
| JP | S 63195481 A | 8/1988 |

OTHER PUBLICATIONS

Chinese Office Action for CN Application No. 201910414188.7, dated Jul. 21, 2020 with English Translation.

* cited by examiner

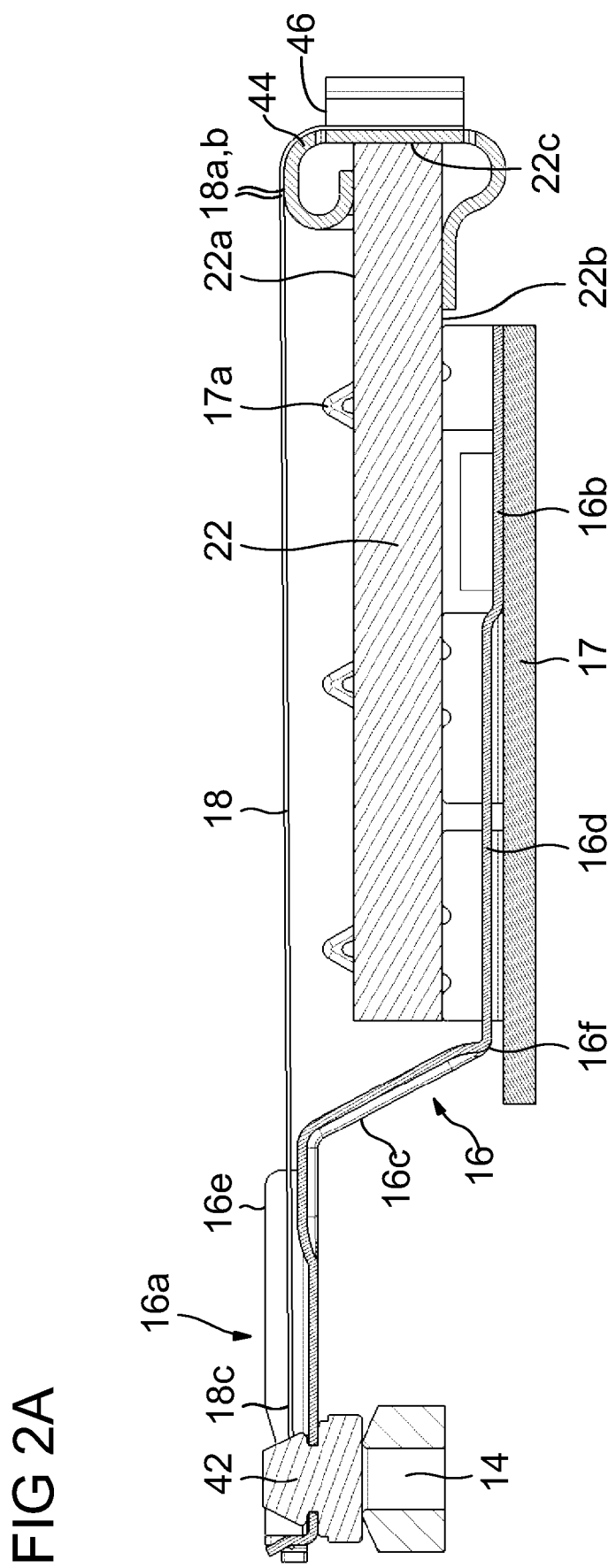

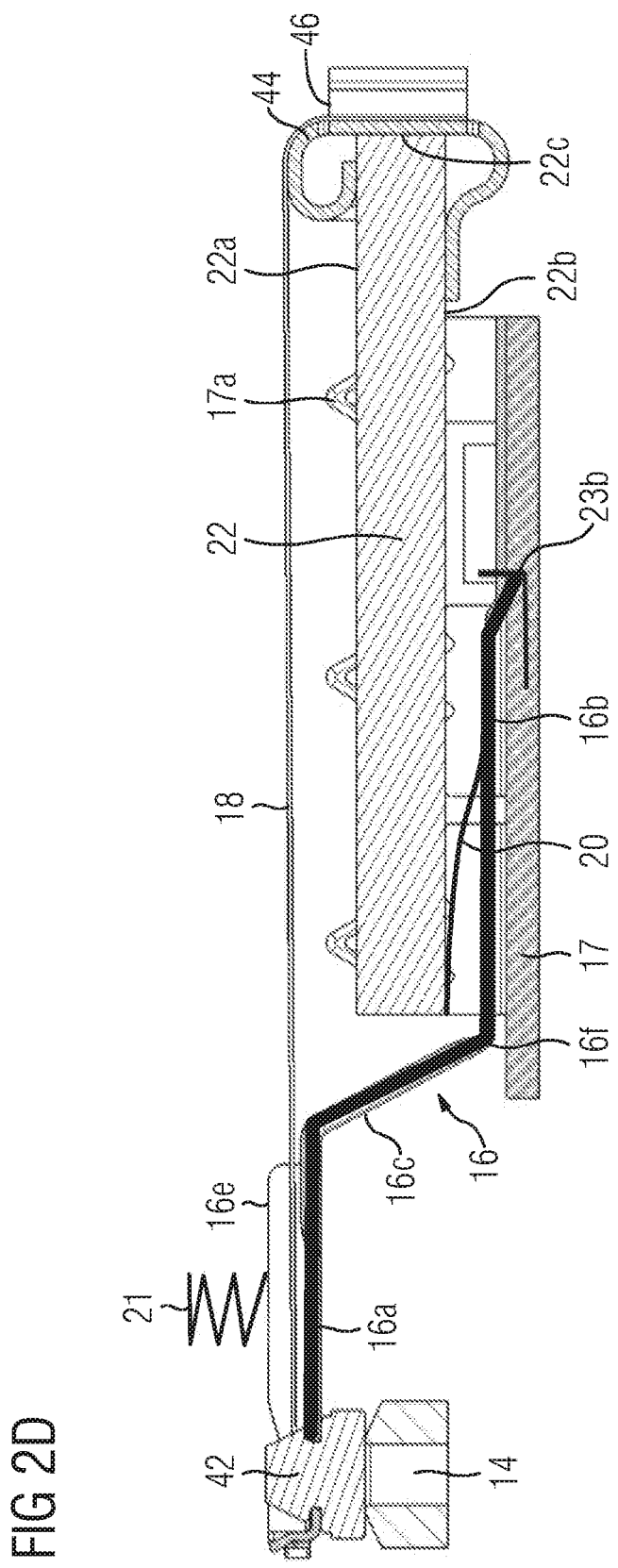

VALVE AND VALVE ARRANGEMENT

CROSS-REFERENCE TO RELATED APPLICATIONS

This application claims benefit to German Application No. 10 2018 112 090.7, filed May 18, 2018, which is incorporated by reference herein.

TECHNICAL FIELD

The disclosure relates to a valve with a valve housing, which encloses a valve chamber and has at least one valve opening. To actuate such a valve, an actuating element has been arranged inside the valve chamber, which can be moved between a closing position to close the valve opening and an opening position to release the valve opening. The disclosure also relates to a valve arrangement with several valves.

BACKGROUND

The movement of an actuating element between an opening and closing position can take place with the help of shape memory alloys (SMAs) in form of wires, for example. These are alloys that can exist in two different crystalline structures depending on their temperature. At room temperature, there is a martensitic structure with a tetragonal, space-centered lattice, which starting at a transformation temperature of approx. 100° C., undergoes a transformation to become an austenitic structure with a cubic face-centered lattice. Therefore, a wire having such a shape memory alloy is capable of shortening due to the lattice transformation from a martensitic to an austenitic structure when heated above the transformation temperature. In order to heat the SMA element, current is usually applied to it and as a result this, it can move the actuating element.

A valve with a valve housing enclosing a pressure chamber is known, for example, from DE 10 2005 060 217, whereby a tappet for opening and closing a valve opening is arranged inside the pressure chamber. Here, to move the valve opening, the tappet is moved by an SMA element electrically connected to a printed circuit board arranged inside the valve housing so current can be applied to it. Since the SMA element is arranged inside the pressure chamber, it is directly exposed to the volume flow of the valve, i.e. to the air flowing in or out of the pressure chamber through the valve openings. In this case, the SMA element extends on both sides of the tappet, so that it is V-shaped.

Such a valve or valve arrangement can be used to fill media reservoirs, e.g. fluid bubbles, particularly air bubbles or air cushions, in the field of automobile seats. The known valves with only one actuator can be used either to fill or empty the bubble. Individually, they are not suitable for maintaining a pressure in the bubble. To do this, a two valve combination with the known valves is necessary. In addition, the known valves have a large size.

SUMMARY

It is therefore the task of the disclosure to specify a valve and valve arrangement whose aforementioned disadvantages have been improved.

The task of the disclosure is solved by means of a valve with a valve housing that includes a housing lid, a housing bottom, and an intermediate housing arranged between the housing lid and the housing bottom, whereby the valve housing encloses a valve chamber that includes a flow chamber and an actuating chamber, whereby the valve housing has at least one valve opening going from the flow chamber to the actuating chamber, and whereby inside the actuating chamber there have been arranged at least one actuating element—which has a valve element on a first end and is connected on a second end to the valve housing and/or a base plate—movable between a closing position to close the valve opening and an opening position to release the valve opening, a wire- or band-shaped SMA element made of a shape memory alloy that serves to actuate the actuating element in opening direction, and a printed circuit board, whereby the SMA element is fixed to the actuating element with a middle section and electrically connected to the printed circuit board with its ends so a current can be applied to it, whereby the SMA element is bent in U-shape in the middle section, or consists of two parts that are essentially arranged parallel to one another, whereby the flow chamber and the actuating chamber are separated from each other in such a way by a separating wall in the valve opening that a fluid flowing through the flow chamber is guided when the actuating element is actuated, whereby a first area of the flow chamber and a second area of the flow chamber are connected to one another through the valve opening and/or a connecting channel, whereby the valve opening and/or the connecting channel is closed in the closing position of the actuating element and released in the opening position of the actuating element, whereby the first area of the flow chamber is or can be connected to an air supply unit so air can flow into the flow chamber and whereby the second area of the flow chamber is or can be connected to a media reservoir, and whereby the second area of the flow chamber is or can be connected to the atmosphere via an opening so air can flow out of the flow chamber, whereby inside the second area of the flow chamber an actuator is arranged with a first end section and a second end section, pivoted in such a way with the second end section on the valve housing and coupled in the area of the first end section with the actuating element in the area of the first end of the actuating element that the opening to the atmosphere is released when the actuating element is in closing position and the opening is closed when the actuating element is in release position.

Thus, the SMA element can either be U-shaped with a U-shaped arc or consist of two parts that are essentially U-shaped without a U-shaped arc. In the latter case, the middle section is understood to be a third and fourth section that would have been connected to the U-shaped arc in case of a U-shape.

To mount the SMA element, projections can be provided especially in the first section of the actuating element, around which the SME element extends or on which the third and fourth end section are mounted.

In the embodiment, a first check valve is provided in or on the valve opening to prevent fluid from flowing back from the second area of the flow chamber through the valve opening to the first area of the flow chamber when the actuating element is in opening position.

In another embodiment, the actuator includes a shift finger on an end section facing the actuating element, and the first check valve is formed by a sealing element arranged on the shift finger and a valve seat arranged in the separating wall.

Expediently, the sealing element is a plate-shaped element or a lip seal. Preferably, the sealing element is made of metal, plastic or elastomer.

In the embodiment, the second area of the flow chamber has an opening to the atmosphere.

In another embodiment, the separating wall that separates the flow chamber and the actuating chamber from each another is formed by the intermediate housing.

Expediently, the actuating element and actuator are linear, i.e. not arranged at an angle to one another.

The actuating element can be designed as flexible spring attached in a torque-proof way to the base plate or the actuating element is a lever element made of a bending-resistant material attached to the base plate so it can swivel, whereby the deflection is restricted by a spring, especially a spiral spring.

Expediently, the actuating element is returned to its original position by means of spring force, particularly by a leaf or coil spring, whereby the leaf or coil spring is preferably arranged between the actuating element and a valve bottom.

The second task is solved by the valve arrangement with several valves according to the invention, especially designed in each case according to one of the preceding claims, whereby the valve housing that in each case encloses the valve chamber of a valve, especially the intermediate housings and/or housing lids and/or housing bottoms and/or printed circuit boards, are executed as one piece.

Expediently, the several valves have a common pressure connection that ends in each case in the valve chamber, especially in the flow chamber, very preferably in the first area of the flow chambers of the valves or in an area that includes the first area of the flow chambers of the valves or is connected in each case to the valve chamber, especially to the flow chamber, very preferably to the first area of the flow chambers or to the area, through at least one air channel, and whereby each valve has a separate opening for connection to the atmosphere, which ends especially in the second area of the flow chamber.

In the embodiment, the valve chambers of the several valves are separated from the receiving space for the electronic contacting of the printed circuit board by a separating wall, whereby the separating wall is especially executed as one piece with the intermediate housing, whereby the separating walls have, when assembled, a pneumatically sealed passage opening for the printed circuit board.

In another embodiment, guiding elements are arranged in such a way in an air channel leading from the air supply unit to the flow chamber(s) that a fluid flowing in and/or through the flow chambers does so with a laminar flow.

BRIEF DESCRIPTION OF THE DRAWINGS

The disclosed subject matter will be explained below in more detail, also with respect to additional characteristics and advantages, by describing the embodiments and with reference to the enclosed drawings, which show in each case in a schematic sketch:

FIG. 2A is a sectional view of an actuator according to a first embodiment in closing position, FIG. 2D is a sectional view of an actuator according to a fourth embodiment.

DETAILED DESCRIPTION

Figure 1:
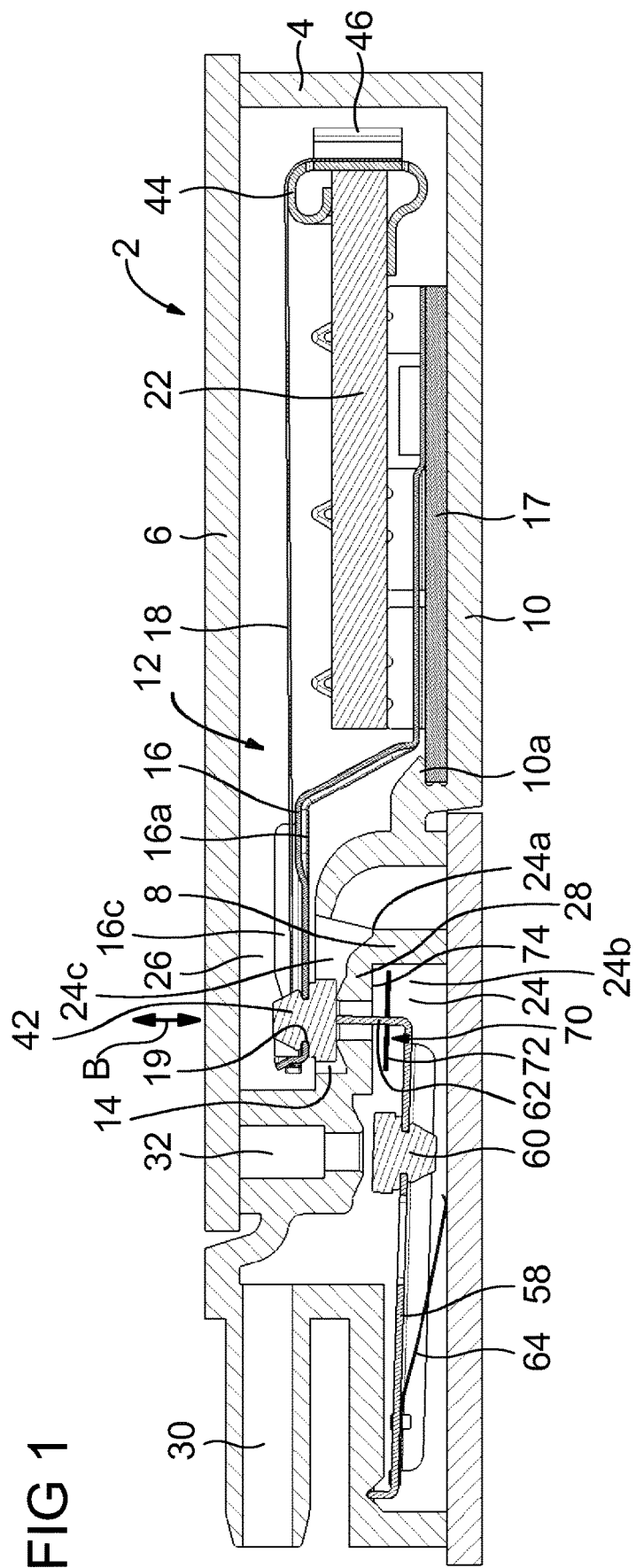
FIG. 1 is a sectional view of a valve.

FIG. 1 shows a sectional view of a valve 2 according to the disclosure. The valve 2 is housed in a valve housing 4. The valve housing 4 includes a housing lid 6, a housing bottom 10 and an intermediate housing 8 housed therein.

The valve housing 4 encloses a valve chamber 12, in which a valve opening 14 ends. Inside the valve chamber 12, an actuating element 16 has been arranged, movable in a direction of movement B between a closing position for closing the valve opening 14 and an opening position for releasing the valve opening 14. To actuate the actuating element 16 in an opening direction or stroke direction H, there is a wire-shaped SMA element 18 made of a shape memory alloy held with a middle section 18c on the actuating element 16, to be more precise on its first end section 16a. The SMA element is arranged in a U-shape. So current can be applied to it, the ends 18a, 18b of the SMA element 18 are electrically connected to a printed circuit board 22 with a valve chamber 12 likewise arranged inside the valve chamber 12.

The valve chamber 12 is subdivided into a flow chamber 24 and an actuating chamber 26, separated from one another by a separating wall 28, so that a fluid flowing through the valve 2 or valve chamber 12 when the actuating element 16 is actuated merely flows through the flow chamber 24. In this case, the flow chamber 24 is formed by the intermediate housing 8 and its bottom side is closed by the housing bottom 10. The actuating chamber 26 is also formed by the intermediate housing 8 and its upper side is closed by the housing lid 6, which makes it possible to reduce the number of components needed. The actuating element 16 and the components necessary for actuating the actuating element 16, namely the SMA element 18, the reset actuating element 20, which is either formed as one piece together with the actuating element 16 or by a separate spring as in the second, third and fourth embodiment, and the printed circuit board 22 are arranged inside the actuating chamber 26. By selectively guiding the flow of the fluid and providing the actuating element 16e with lateral walls, a non-uniform cooling of the SMA element 18 is prevented. The separating wall 28 is executed as one piece with the intermediate housing 8 or molded into it. The flow chamber 24 has a first area 24a and a second area 24b connected to one another via a connecting channel 24c that is closed in a closing position of the actuating element 16 and released in an opening position of the actuating element 16.

So air can be supplied to the valve chamber 12, more precisely to the flow chamber 24, its first area 24a is connected to an air supply unit or pneumatic pump or to a pressure connection (not visible in FIG. 1), that is or will be connected to the pneumatic pump through a supply line, ends directly or indirectly in the first area 24a of the flow chamber 24. By releasing the valve opening 14, the supplied air can flow through the connecting channel 24c or the valve chamber 12 and through the valve opening 14 from the first area 24a into the second area 24b. The connecting channel 24c becomes the actuating area, especially also bounded by a bottom side of the actuating elements 16 and the sealing element 42. The valve 2 serves especially for filling a media reservoir (not shown), which can be an air cushion of an automobile seat with contour adjustment. To do this, the valve chamber 12, more precisely the flow chamber 24 or its second area 24b, is fluidically connected to a consumer connection 30 or the consumer connection 30 ends in the second area 24b, so that the media reservoir can be connected to the valve 2 with hoses. In the embodiment shown, both the pressure connection and the consumer connection 30 are formed as one piece with the intermediate housing 8 and do not protrude from it above an outer enclosing end of the housing.

In order to reliably close the valve opening 14 in the closing position—as shown in FIG. 1—, a first sealing element 42 that closes the valve opening 14 has been arranged on the end section 16a facing the valve opening 14 that acts together with a sealing seat that surrounds the valve opening 14. The sealing element 42 extends expediently through a passage hole 19.

To control the valve 2 and apply current to the SMA element 18 to shorten it and thereby actuate the actuating element 16, the ends 18a, 18b are electrically connected to the printed circuit board 22, specifically by means of a crimp connector 44. The ends 18a, 18b of the SMA element 18 are in each case mounted in a seat 46 of the crimp connector 44 and thus make indirect contact with the printed circuit board 22 via the crimp connector 44. Each one of the crimp connectors 44 protrude laterally above the printed circuit board 22, perpendicularly to the direction of movement B. Moreover, the crimp connectors 44 extend in stroke direction H from a top side 22a of the printed circuit board 22 and parallel to it towards the housing bottom 8. The crimp connector 44, in particular, has a rounded surface that serves to deflect the ends of the SMA elements 18a, 18b by an angle, preferably 90°, so that compared to the section of the SMA elements incorporated in the seat 46, they are perpendicular to a middle section 18c of the SMA element 18.

The valve 2 shown in FIG. 1 has another valve opening, specifically an opening 32 that connects the valve chamber 12 to the atmosphere to allow air to flow out of the valve chamber 12. An actuator 58 is arranged inside the valve chamber 12 or inside the flow chamber 24, pivoted on the valve housing 4, and operatively connected to the actuating element 16. The actuator 58 has a second sealing element 60 in a section facing the opening 32 to close the opening 32. In an end section facing the actuating element 16, the actuator 58 includes a shift finger 62, which is in contact with the actuating element 16 or fits closely on its first sealing element 42. If the actuating element 16 is actuated and the valve opening 14 opened, the shift finger 62 is also moved in stroke direction due to a reset actuating element 64, here a leaf spring, and the actuator 58 is thus moved around its turning point, so that the opening 32 is closed by the second sealing element 60. If no current is applied any longer to the SMA element 18 and the actuating element 16 is therefore moved in return direction R due to the reset actuating element 20, the shift finger 62 is likewise moved in return direction R by the actuating element 16 or its first sealing element 42. As a result of this, the second sealing element 60 opens the opening 32. Thus, the opening 32 to the atmosphere is released when the actuating element 16 is in closing position and closed when the actuating element 16 is in release position. Furthermore, the first check valve 70 is arranged in the second area of the flow chamber 24c. The first check valve 70 is designed in a way to allow the fluid to flow from a first area of the flow chamber 24a through the valve opening 14 into the second area of the flow chamber 24c. In reverse direction, the first check valve 70 prevents a return flow from the second area of the flow chamber 24c through the valve opening 14.

The third sealing element 72 is designed as a circular disc made preferably of metal or elastomer. The sealing element 72 lies on the valve seat 74 when the check valve 70 is in a closing position, so that a fluid flowing from the side of the valve seat 74 towards the valve opening 14 presses on the sealing element 72 on the valve seat 74. On the other hand, a fluid coming from the side of the valve opening 14 presses the third sealing element 72 away from the valve seat 74, thereby opening the check valve 70 for this flow direction.

Here, the sealing element 72 can be designed in a movable way on the shift finger 62 or fixed in place.

If the actuating element 16 is actuated and the valve opening 14 is opened, the shift finger 62 is also moved in hub direction due to a reset actuating element 64, here a leaf spring, and the actuator 58 is thus turned around its turning point, so that the second sealing element 60 closes the opening 32. If no current is applied any longer to the SMA element 18 and the actuating element 16 is thus moved in return direction R owing to the reset actuating element 20, the shift finger 62 is likewise moved in return direction R by the actuating element 16 or sealing element 38. As a result of this and due to a V-shaped turning point 66 of the actuator 58, the second sealing element 60 opens the opening 32. Thus, the opening 32 to the atmosphere is released when the actuating element 16 is in closing position and closed when the actuating element 16 is in release position, thereby ensuring that the second area 24b of the flow chamber 24 of the valve chamber 12 or a media reservoir is always vented when the valve 2 is not actuated. Furthermore, the actuating chamber 26 is connected to the first area 24a of the flow chamber 24 and above to the pump. Such a valve is used, for example, in an automobile seat with massage function, whereby one or several air cushions are in each case cyclically aerated and vented.

FIG. 2A shows a sectional view of an actuator according to a first embodiment. The actuator includes an actuating element 16 arranged on a base plate 17 and attached to it. In the second end section 16b, the actuating element is two-dimensionally attached to the base plate 17.

The actuating element 16 has a first end section 16a and the second end section 16b. A middle section of the actuating element 16c, in which the actuating element 16 is bent stepwise and which includes an elastic section 16d, extends between the two end sections 16a and 16b. The elastic section 16d is arranged above the base plate 17. However, the elastic section 16d and the base plate 17 are arranged together in such a way that the elastic section 16d can be bent. A bending of the elastic section 16d is limited by a stop of the actuating element 16 in a stop area of the actuating element 16f. A pre-stressing, in particular, can be achieved by bending the elastic section 16d and mounting on the base plate 17.

A sealing element 42 to close and release a valve opening 14 has been arranged in the first end section of the actuating element 16a. To do this, the first end section of the actuating element 16a has a passage hole 19, e.g. a borehole, in which the sealing element 42 is arranged in a form-fitting way.

Furthermore, the first end section of the actuating element 16a has lateral walls 16e that extend circumferentially, perpendicular to the first end section of the actuating element 16a.

The base plate 17 has connectors 17a for connecting a printed circuit board 22. With the connectors 17a, the printed circuit board 22 is arranged on an opposite side of the actuating element. The connectors 17a are configured as press-fit pins here. Thus, a top side 22a of the printed circuit board 22 points to the SMA element and a bottom side 22b to the base plate 17.

A clamp that includes a crimp connector 44 has been arranged on a side facing away from the first end section of the actuating element 16a. The crimp connector has a seat 46. By means of two crimp connectors 44 arranged parallel to one another, an SMA element is held on a first end 18a and second end 18b. The SMA element 18 extends from the crimp connector 44 in U-shape to the first end section 16a of the actuating element. The SMA element is connected in such a way to the first end section 16a with a middle section of the SMA element 18c that a shortening of the SMA element causes a stroke of the actuating element from a closing position (cf. FIG. 2A) to an opening position.

Figure 2B:
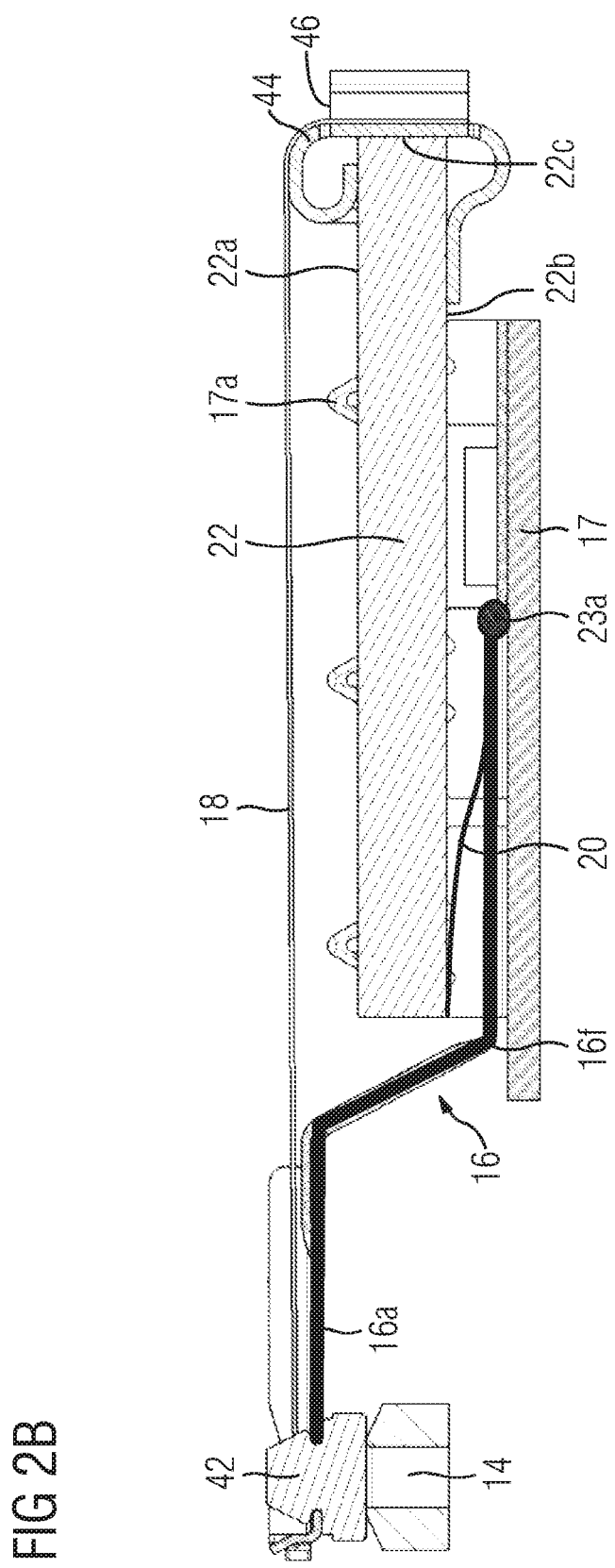
FIG. 2B is a sectional view of an actuator according to a second embodiment.

FIG. 2B shows a sectional view of a second embodiment of an actuator. In this embodiment, the actuating element 16 has been rigidly executed. The base plate 17 and the actuating element 16 are connected to one another through a hinge 23a (which can be executed as foil hinge) on a second end section 16b of the actuating element. The position of the hinge 23a on the base plate 17 can be arranged under or adjacent to the printed circuit board 22. If the position of the hinge 23a is adjacent to the printed circuit board 22, the actuating element 16 has expediently only one angle. To return the actuating element to a closing position, a reset actuating element 20 is provided as leaf spring in the embodiment shown, whereby the leaf spring presses against a bottom side 22b of the printed circuit board. The reset actuating element 20 can be executed as one piece with the actuating element 16. Expediently, in this embodiment, the SMA element 18 is conductively connected to a first contact in the area of the crimp connector 44 with a first end 18a and to a second contact in the area of the crimp connector 44 with a second end 18b.

Figure 2C:
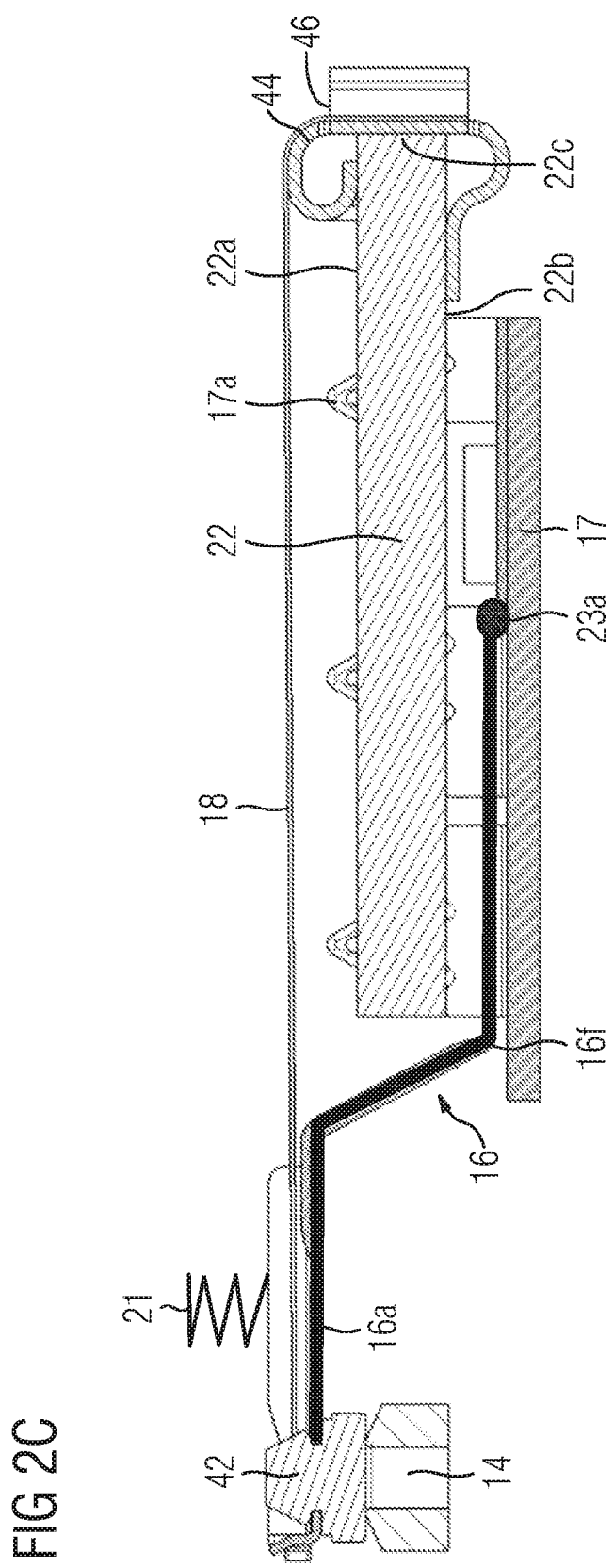
FIG. 2C is a sectional view of an actuator according to a third embodiment.

FIG. 2C shows a third embodiment of the actuator. In the third embodiment, the reset actuating element 20 is replaced by a reset actuating element 21. The reset actuating element 21 is executed as spiral spring that expediently counteracts a valve housing wall. Alternative positions or spring embodiments are possible to reset the actuating element.

FIG. 2D shows a sectional view of a fourth embodiment of an actuator. The fourth embodiment differs from the second and third embodiment in that the actuating element 16 is attached to the base plate via a bearing 23b in a second end section 16b. The bearing 23b can be especially designed as angle or notch in which the second end section 16b of the actuating element is inserted, whereby as in the second embodiment, the length of the second end section of the actuating element and thus the position of the bearing 23b along the base plate 17 can have a different design. In the fourth embodiment, either a reset actuating element 20 or a reset actuating element 21 is provided.

Figure 3:
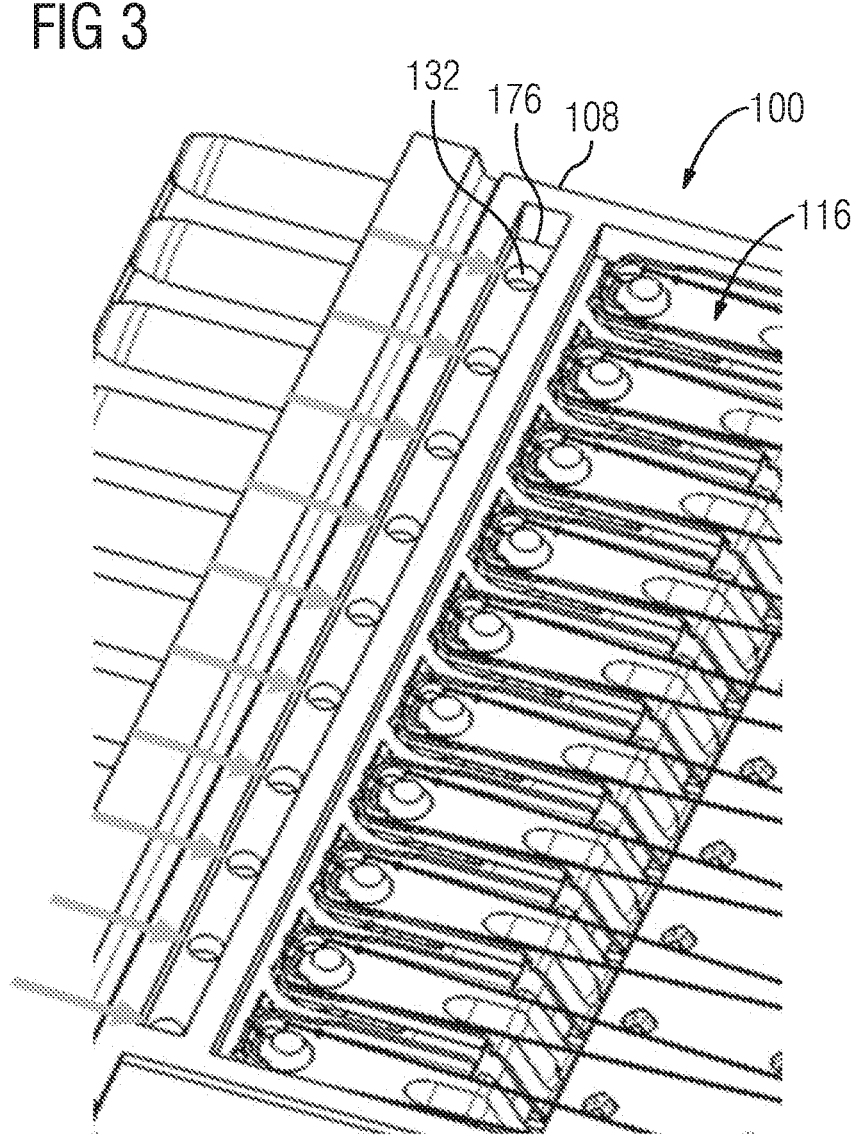
FIG. 3 is a valve arrangement.

FIG. 3 shows a valve arrangement 100. Multiple actuating elements 116 are arranged adjacent to one another with an intermediate housing. The openings 132 are arranged in a venting channel 176, so that the venting can be combined to one common venting channel. Sound insulation can be integrated in such a venting channel. By providing only one opening to the atmosphere at the end of the venting channel, the penetration of dirt and/or moisture can be greatly reduced.

LIST OF REFERENCE CHARACTERS

2 Valve
4 Valve housing
6 Housing lid
8 Intermediate housing
10 Housing bottom
12 Valve chamber
14 Valve opening
16 Actuating element
16a First end section of the actuating element
16b Second end section of the actuating element
18 SMA element
18a First end of the SMA element
18b Second end of the SMA element
18c Middle section of the SMA element
20 Reset actuating element (coil spring)
21 Reset actuating element
22 Printed circuit board
22a Top side of the printed circuit board
22b Bottom side of the printed circuit board
24 Flow chamber
24a First area of the flow chamber
24b Second area of the flow chamber
24c Connecting channel
26 Actuating chamber
28 Separating wall
30 Consumer connection
32 Opening
42 First sealing element
44 Crimp connector
46 Seat for the crimp connector
58 Actuator
60 Second sealing element
62 Shift finger
63 Projection
64 Reset actuating element
70 First check valve
72 Third sealing element
73 Passage hole
74 Valve seat
100 Valve arrangement
106 Housing lid
108 Intermediate housing
110 Housing bottom
116 Actuating element
132 Openings
176 Air channel
B Direction of movement of the actuating element
H Stroke direction
R Return direction

The invention claimed is:

1. A valve comprising:
a valve housing including a housing lid, a housing bottom, and an intermediate housing arranged between the housing lid and the housing bottom, the valve housing enclosing a valve chamber including a flow chamber and an actuating chamber, the valve housing defining at least one valve opening extending to the actuating chamber from the flow chamber;
at least one actuating element being located in the actuating chamber and being movable between a closing position to close the valve opening and an opening position to release the valve opening, an SMA element made of a shape memory alloy being configured to operate the actuating element in the opening direction, a first end of the actuating element being connected to a valve element and a second end of the actuating element being connected to at least one of the valve housing and a base plate, a first end and a second end of the SMA element being electrically connected to a printed circuit board and a middle section of the SMA element being fixed to the actuating element, the SMA element configured with two parts extending substantially parallel to one another;
the flow chamber and the actuating chamber being separated by a separating wall defining the valve opening so that a fluid flowing through the valve when the actuating element is actuated is guided through the flow chamber, a first area of the flow chamber and a second area of the flow chamber being connected via at least one of the valve opening and a connecting channel, the at least one of the valve opening and the connecting channel being closed when the actuating element is in the closing position and being released when the actuating element is in the opening position;

the first area of the flow chamber being attachable to an air supply unit to supply air to the flow chamber, the second area of the flow chamber being attachable to a media reservoir, the second area of the flow chamber being connectable to atmosphere to release air from the flow chamber via an opening;

an actuator located inside the second area of the flow chamber having a first end section and a second end section, the actuator being pivotable on the valve housing via the second end section and the first end section being coupled to the actuating element adjacent the first end of the actuating element so that the opening to the atmosphere is released when the actuating element is in the closing position and the opening is closed when the actuating element is in the opening position.

2. The valve according to claim 1, further including a first check valve associated with the valve opening, the first check valve preventing fluid from flowing back from the second area of the flow chamber through the valve opening into the first area of the flow chamber when the actuating element is in the opening position.

3. The valve according to claim 2, wherein the actuator includes a shift finger on an end section facing the actuating element, the first check valve including a sealing element arranged on the shift finger and a valve seat arranged in the separating wall.

4. The valve according to claim 3, wherein the sealing element is a plate-shaped element.

5. The valve according to claim 3, wherein the sealing element is a lip seal.

6. The valve according to claim 3, wherein the sealing element includes one of a metal, a plastic, or an elastomer.

7. The valve according to claim 1, wherein the second area of the flow chamber defines an opening to the atmosphere.

8. The valve according to claim 1, wherein the separating wall is formed by the intermediate housing.

9. The valve according to claim 1, wherein the actuating element and the actuator are linearly arranged.

10. The valve according to claim 1, wherein the actuating element is configured as a flexible spring connected torque-free to the base plate.

11. The valve according to claim 1, wherein the actuating element is configured as a lever element made of a bending-resistant material attached pivotably to the base plate.

12. The valve according to claim 1, wherein the actuating element is reset via spring tension of a spring, wherein the spring is arranged between the actuating element and a valve bottom.

13. A valve arrangement including several of the valves according to claim 1, wherein the valve housings enclosing the valve chamber of each of the valves are executed as one unitary valve housing.

14. The valve arrangement according to claim 13, wherein at least one of: all of the intermediate housings, all of the housing lids, all of the housing bottoms, and all of the printed circuit boards are formed in respective unitary elements.

15. The valve arrangement according to claim 13, wherein the several valves have a common pressure connection that ends in the valve chamber.

16. The valve arrangement according to claim 15, wherein the common pressure connection ends in one of the first areas of the flow chambers of the valves or an area including the first areas of the flow chambers, or is connected to the valve chamber via at least one air channel, and wherein each valve defines a separate opening for connection to the atmosphere ending in the second area of the flow chamber.

17. The valve arrangement according to claim 13, wherein the valve chambers of the valves are separated from a receiving space for the electronic contacting of the printed circuit board by respective separating walls, the separating walls being unitary with the intermediate housing, the separating walls defining a pneumatically sealed passage opening for the printed circuit board.

18. The valve arrangement according to claim 13, wherein the at least one unitary valve housing defines at least one air channel leading from the air supply unit to at least one of the flow chambers, guiding elements being arranged in the at least one air channel to guide a fluid flowing through the at least one of the flow chambers in a laminar flow.

19. The valve according to claim 1, the SMA element being configured as one of a U-shape with a bend in the middle section between the two parts or as a doubled shape wherein the two parts are not unitary.

* * * * *